(12) United States Patent
Jian-Ping et al.

(10) Patent No.: US 6,297,973 B1
(45) Date of Patent: Oct. 2, 2001

(54) POWER CONVERTER FOR CORRECTING POWER FACTOR

(75) Inventors: Ying Jian-Ping; Lu Bing; Zeng Jian-Hong, all of Taipei (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 09/808,199

(22) Filed: Mar. 13, 2001

(30) Foreign Application Priority Data

Nov. 30, 2000 (TW) ................................................ 089125524

(51) Int. Cl.$^7$ ................................................... H02M 5/45

(52) U.S. Cl. ................................. 363/37; 363/40; 363/98; 363/132

(58) Field of Search ............................ 363/17, 34, 37, 363/98, 132, 67, 69, 71, 40

(56) References Cited

U.S. PATENT DOCUMENTS

| | | | | |
|---|---|---|---|---|
| 5,283,727 | * | 2/1994 | Kheraluwala | 363/98 |
| 5,598,326 | * | 1/1997 | Liu et al. | 363/34 |
| 6,034,489 | * | 3/2000 | Weng | 363/34 X |

* cited by examiner

*Primary Examiner*—Jessica Han
(74) *Attorney, Agent, or Firm*—Niro, Scavone, Haller & Niro (57) ABSTRACT

A power converter for converting electrical power is provided. The power converter includes a first converting circuit. The first converting circuit has a switch assembly alternatively turning on and off for converting a direct current (DC) to a first alternating current (AC), a transformer coupled to the switch assembly for transforming the first alternating current to a second alternating current, a major switch coupled in parallel with the switch assembly and a first switch device, a boosting switch coupled in parallel with the switch assembly and a second switch device, and a first capacitor coupled in series with the boosting switch.

33 Claims, 10 Drawing Sheets

POWER CONVERTER FOR CORRECTING POWER FACTOR

FIELD OF THE INVENTION

The present invention relates to a power converter. More specifically, the present invention relates to a power converter that can be applied by a MOSFET or IGBT semiconductor-switching device and used for converting direct current or alternating current.

BACKGROUND OF THE INVENTION

A power converter implemented by semiconductor switching devices, e.g. MOSFET (metal-oxide-semiconductor field effect transistor) or IGBT (insulated-gate bipolar transistor), is commonly used for converting an alternating current or a direct current and connecting different communication electrical source with electric-operated electrical source.

Figure 1:
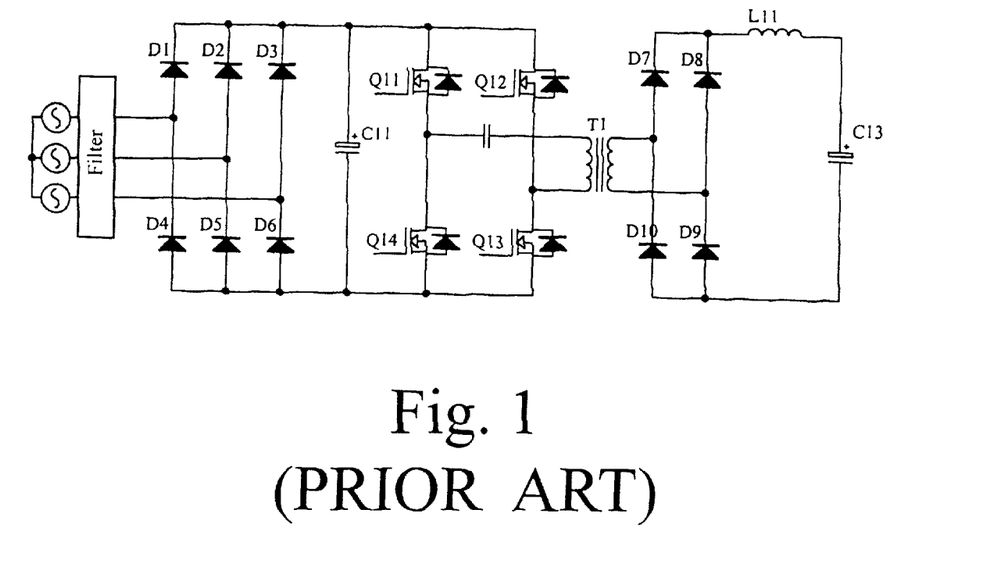
FIG. 1 is a full-bridge circuit of an AC/DC converter according to the prior art.

FIG. 1 shows a circuit of a conventional full-bridge alternating/direct current converter therein. The converter includes a rectifying circuit composed of six rectifier diodes D1 to D6, a filtering circuit composed of a filtering capacitor C11 for converting an input AC voltage into a smoothing DC voltage, a DC-to-DC circuit composed of four full-bridge semiconductor switching devices Q11 to Q14, a transformer T1, a set of rectifier diodes D7 to D10 and a LC filtering circuit composed of a capacitor C13 and a inductor L11. The AC/DC current converter shown in FIG. 1 often needs a large capacitor C11 as a filtering segment, the input current will not be in real state so as to reduce the converting efficiency when the capacitor C11 is disposed in the converter. Thus, the conventional converter having a large capacitor therein do not meet the requirement in different countries concerning the harmonic wave of the input current in an electric appliance. In order to meet the requirement of the harmonic wave of the input current, the converter needs an additional filter to be disposed in the filtering segment. This kind of converter is always built in a huge bulk to filter the harmonic wave because the input current has a lot of harmonic wave component therein, which is costly. However, the circuit is simple and the switching device in the converter is cheap to be used in manufacturing line. Thus, the circuit structure in such of converter is widely.

Figure 2:
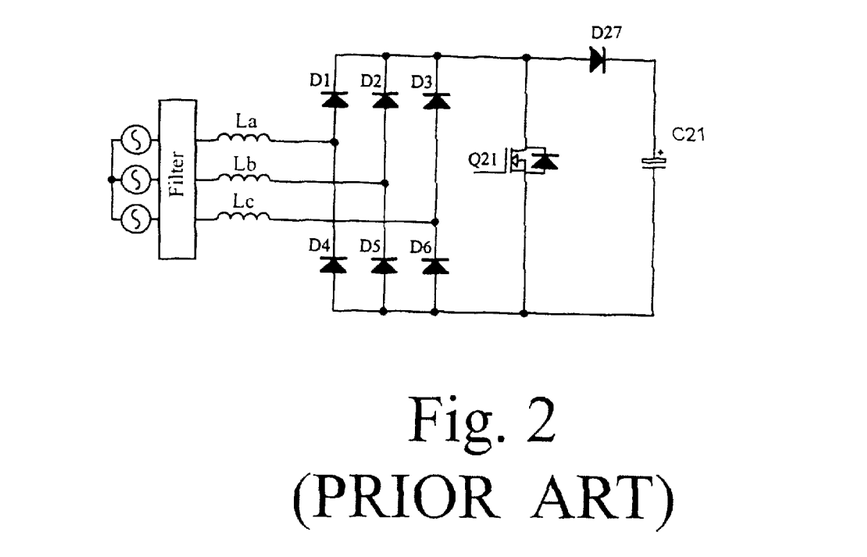
FIG. 2 is a conventional boosting circuit structure of a rectifier circuit according to the prior art.

FIG. 2 shows a conventional boosting circuit structure in a rectifying circuit according to the prior art. A major switch Q21 is added to the rectifying circuit to be connected in parallel with six rectifier diodes D1 to D6, and further connected in series with a boosting diode D27 via a filtering capacitor C21. The working principle of the boosting circuit is described as the following descriptions.

When the major switch Q21 is turned-on, a three-phase voltage will be shortened by three input inductors La, Lb and Lc. A three-phase input current is proportional to each phase of the three-phase voltage when the boosting circuit is working. On the contrary, when the major switch Q21 is off, the output voltage will reduce the three-phase input current. If the turned-off time of the major switch is short enough to be ignored, the average value of respective input current of the three-phases input current to be inputted into the circuit is proportional to the respective voltage of the three-phases voltage. In addition, if the on/off frequency in the major switch is high enough to filter the harmonic wave, only a small filter could filter off the high harmonic wave in the boosting circuit. As a result, the AC to DC converter shown in FIG. 2 has a power factor correcting function therein. However, this converter still produces a higher output voltage. For example, when an input voltage 380 volts is inputted, a high voltage 1000 volts is outputted by the converter to meet the requirement of the IEC61000-3-2 safety standard.

A harmonic-wave inputting method is proposed to control the input harmonic wave so as to reduce the output voltage and meet the requirement of the safety standard of input harmonic wave. The wave head in the three-phase rectifying circuit can be used to control the duty ratio in the major switch. Theoretical and practical experiment proved that the harmonic wave in the input current and the output voltage outputted by the three-phase rectifying circuit could be greatly reduced by the harmonic-wave inputting method. In other word, the value of the output voltage can be reduced and also meet the requirement of the standard of input harmonic wave. For example, the output voltage can be reduced to 750 volts to meet the requirement of the IEC61000-3-2 safety standard by the harmonic-wave inputting method.

Figure 3:
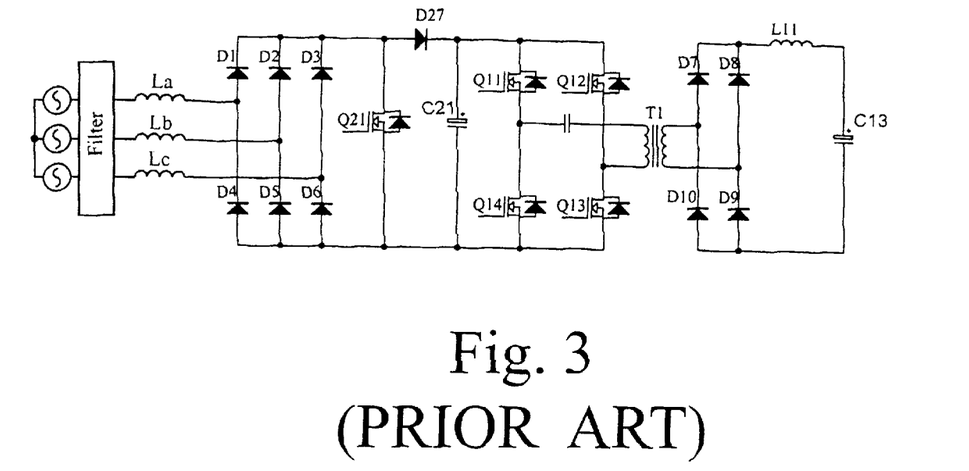
FIG. 3 is the rectifying circuit of a full-bridge AC/DC converter shown in FIG. 2.

Although the harmonic-wave inputting method can reduce the output voltage from a converted circuit, the voltage is still high voltage, e.g. 750 volts, which is hard for general users to use such high voltage situation. Furthermore, the reduced voltage can be further converted by another DC/DC converter so as to reduce the high output convert into a useful circuit for the general users to operate. FIG. 3 shows a coupled circuit formed by the boosting circuit connected in series with a full-bridge DC/DC circuit. As can be seen in FIG. 3, the electrical power of the coupled circuit needs to be transmitted by two converting stages, and has the disadvantage that the soft turned-on switch cannot naturally operated. Thus, the electrical power cannot be efficiently converted in the coupled circuit.

It is attempted by the applicant to provide an electrical converter to overcome the problems as described above for reducing the harmonic wave and increasing the converting efficiency in the converter.

SUMMARY OF THE INVENTION

It is therefore an object of the present invention to provide a power converter for reducing the harmonic wave when a high input harmonic wave of an input is converted.

According to the present invention, the power converter includes a first converting circuit. The first converting circuit includes a switch assembly alternatively turning on and off for converting a direct current (DC) to a first alternating current (AC), a transformer coupled to the switch assembly for transforming the first alternating current to a second alternating current, a major switch coupled in parallel with the switch assembly, a first switch device couple in parallel with said major switch, and a series-couple boosting switch and a first capacitor coupled in parallel with the switch assembly, said boosting switch couple in parallel with a second switch device.

Preferably, the first converting device further includes a current-limiting inductor coupled in series between the transformer and the switch assembly.

Preferably, the first capacitor is a wave-filtering capacitor, the major switch is further coupled in parallel with a second capacitor and the boosting switch is further coupled in parallel with a third capacitor.

Preferably, the second capacitor and the third capacitor are respectively the internal capacitors of the major switch and the boosting switch. Each of the second and the third capacitor is one of adjustable capacitor and constant capacitor.

Preferably, the power converter further includes a second converting circuit having a structure the same as that of the first converting circuit and coupled in parallel with the first converting circuit.

Preferably, the first converting circuit further has a first rectifying circuit coupled in parallel with the switch assembly and the major switch. And the first rectifying circuit is one of a single-phase rectifying circuit and three-phase rectifying circuit.

Preferably, the power converter further includes a third converting circuit having a structure the same as that of the first converting circuit and coupled in parallel with the first converting circuit.

Preferably, the first converting circuit further has a second rectifying circuit coupled to the transformer and a LC wave-filter coupled to the second rectifying circuit.

Preferably, the second rectifying circuit is one of a single-phase rectifying circuit and three-phase rectifying circuit.

Preferably, the power converter further has a fourth converting circuit having a structure the same as that of the first converting circuit and coupled in parallel with the first converting circuit.

Preferably, the switch assembly is one of a full-bridge switch assembly and half-bridge switch assembly. And the switch assembly is one of uni-polar and bipolar transistors.

Preferably, the first alternative current is a high frequency alternative current. The first switch device is a first diode reversely coupled in parallel with the major switch. The second switch device is a second diode reversely coupled in parallel with the boosting switch. And the first diode and the second diode are respectively the internal diodes of the major switch and the booting switch.

It is therefore another object to provide a power converter for increasing the converting efficiency.

According to the present invention, the power converter has a first converting circuit. The first converting circuit includes a switch assembly alternatively turning on and off for converting a direct current (DC) to a first alternating current (AC), a transformer coupled to the switch assembly for transforming the first alternating current to a second alternating current, a major switch coupled in parallel with the switch assembly, a first switch device couple in parallel with said major switch, a series-couple boosting switch and a first capacitor coupled in parallel with the switch assembly, said boosting switch couple in parallel with a second switch device, and a current-limiting inductor coupled in series between the transformer and the switch assembly.

Preferably, the major switch is further coupled in parallel with a second capacitor and the boosting switch is further coupled in parallel with a third capacitor.

Preferably, the power converter further includes a second converting circuit which has a structure the same as that of the first converting circuit and coupled in parallel with the first converting circuit. And the first converting circuit further includes a first rectifying circuit coupled in parallel with the switch assembly and the major switch.

Preferably, the power converter includes a third converting circuit having a structure the same as that of the first converting circuit and coupled in parallel with the first converting circuit.

Preferably, the first converting circuit further includes a second rectifying circuit coupled to the transformer and a LC wave-filter coupled to the second rectifying circuit.

Preferably, the power converter further includes a fourth converting circuit which has a structure the same as that of the first converting circuit and coupled in parallel with the first converting circuit.

Preferably, the switch assembly is one of a full-bridge switch assembly and half-bridge switch assembly.

Preferably, the first switch device is a first diode reversely coupled in parallel with the major switch, the second switch device is a second diode reversely coupled in parallel with the boosting switch.

It is therefore a further object to provide a power converter for meeting the requirement of the IEC61000-3-2 safety standard by the harmonic-wave input method.

According to the present invention, the power converter includes a first converting circuit. The first converting circuit has a switch assembly alternatively turning on and off for converting a direct current (DC) to a first alternating current (AC), a transformer coupled to the switch assembly for transforming the first alternating current to a second alternating current, a major switch coupled in parallel with the switch assembly and a first switch device couple in parallel with said major switch, a series-couple boosting switch coupled in parallel with the switch assembly and said boosting switch couple in parallel with a second switch device, a first rectifying circuit coupled in parallel with the switch assembly and the major switch, a second rectifying circuit coupled to the transformer and a LC wave-filter coupled to the second rectifying circuit.

Preferably, the power converter further includes a second converting circuit having a structure the same as that of the first converting circuit and coupled in parallel with the first converting circuit.

Preferably, the first converting circuit further includes a current-limiting inductor coupled in series between the transformer and the switch assembly.

Preferably, the power converter further includes a third converting circuit having a structure the same as that of the first converting circuit and coupled in parallel with the first converting circuit.

A better understanding of the present invention can be obtained when the following detailed description of a preferred embodiment is considered in conjunction with the following drawings, in which:

DETAILED DESCRIPTION OF THE PREFERRED EMBODIMENTS

Figure 4:
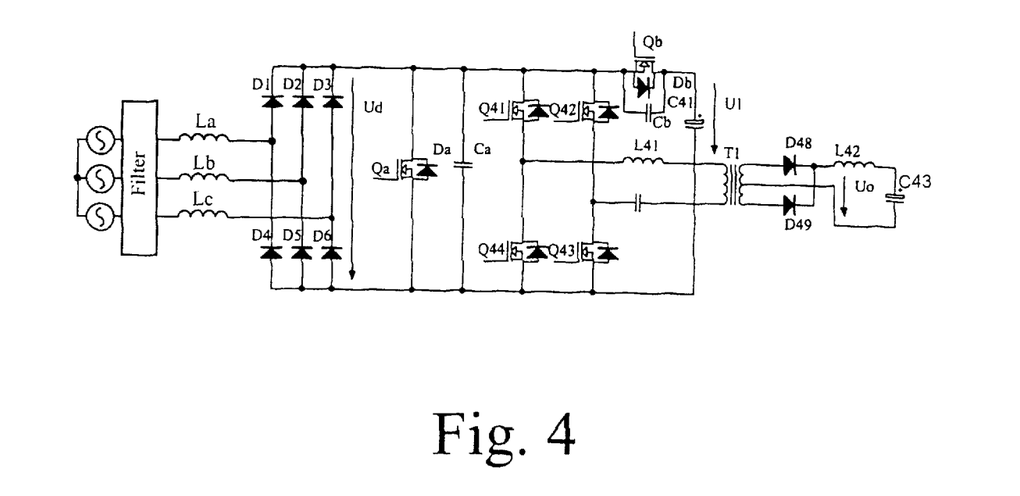
FIG. 4 is a full-bridge circuit of an AC/DC converter according to the preferred embodiment of the present invention.

FIG. 4 is a full-bridge circuit of an AC/DC converter according to the preferred embodiment of the present invention. The main structure of the converter is composed of a converting circuit, a first rectifying circuit, a second rectifying circuit and an LC-wave filter circuit.

The converting circuit in the AC/DC converter includes a switch assembly having four full-bridge switches Q41–Q44 alternatively turning on and off for converting a direct current (DC) into a first alternating current (AC), a transformer T1 coupled to the switch assembly for transforming the first alternating current to a second alternating current, a major switch Qa coupled in parallel with the switch assembly and a first switch device Da coupled in parallel with the major switch Qa, a series-couple boosting switch Qb and a first capacitor C41 coupled in parallel with the switch assembly Q41 to Q44, and the boosting switch Qb coupled in parallel with a second switch device Db. The first switch device Da is a first diode for reversely coupling in parallel with the major switch Qa, and the second switch device is a second diode for reversely coupling in parallel with the boosting switch Qb.

As can be seen in FIG. 4, the converting circuit further includes a current-limiting inductor L41 coupled in series between the transformer T1 and the switch assembly. The major switch Qa is coupled in parallel with a second capacitor Ca. The boosting switch Qb is further coupled in parallel with a third capacitor Cb. The first capacitor C41 of the converting circuit is a wave-filtering capacitor. Each of the second capacitor Ca and the third capacitor Cb are respectively an adjustable capacitor or a constant capacitor and would be respectively internal capacitor of the major switch and the boosting switch.

Moreover, the converting circuit can be further coupled with a first rectifying circuit coupled in parallel with the switch assembly and the major switch Qa. The first rectifying circuit can be a single-phase rectifying circuit or three-phase rectifying circuit, which is composed of six rectifier diodes D1 to D6.

Furthermore, the converting circuit can be further connected to a second rectifying circuit. The second rectifying circuit is composed of two rectifier diodes D48 and D49 in parallel with the transformer T1. In addition, the LC-wave filter circuit including an inductor L42 and a capacitor 43 is coupled in parallel with the second rectifying circuit.

The differences between the circuit structure of the converter between FIG. 4 and that in FIG. 2 are that the boosting diode D27 is replaced with the boosting switch Qb, the connection direction is changed by connecting in parallel with a full-bridge switch assembly Q41 to Q44 after the boosting switch Qb is connected in series with the filtering capacitor C41, a diode Da is reverserly connected in parallel with the major switch Qa and a diode Db is reverserly connected in parallel with the boosting switch Qb.

By combining the components shown in the FIG. 4, the electrical power in the converter can be performed by a guasi-unipole transmitting process, which is different from the electrical energy transmitted described in the prior art. Therefore, all of the switches of the converter in the present invention can naturally operate at zero-current or zero-voltage so as to increase the rectifying efficiency and reduce the electron-magnetic interfering (EMI) in the converter.

The characteristics of the converter for transmitting the current according to the present invention can be understood in details from FIG. 5 to FIG. 8.

Figure 5:
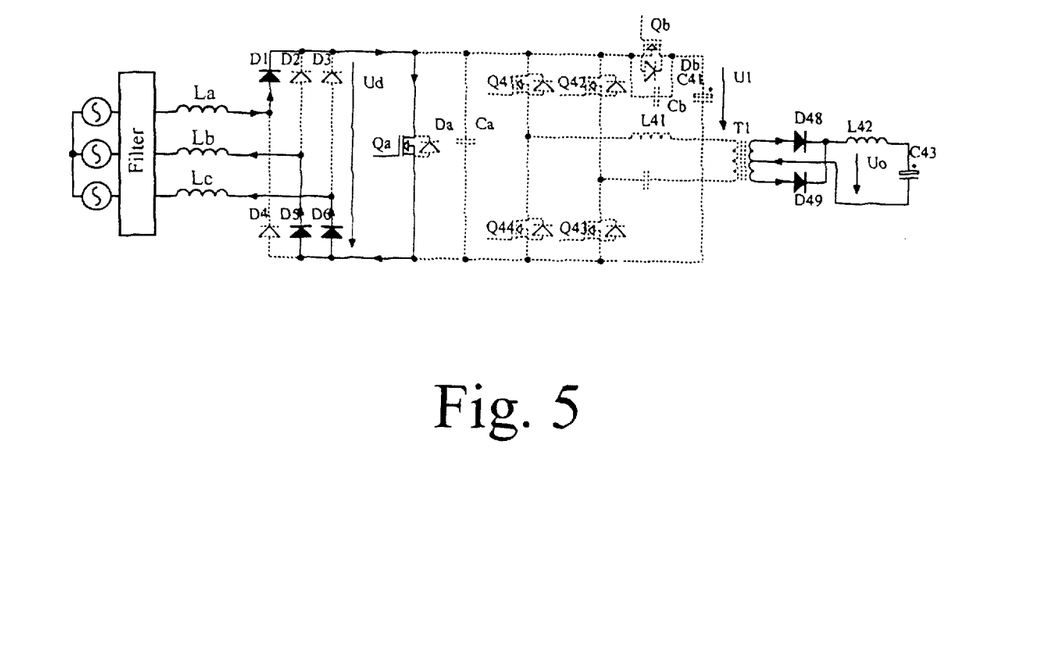
FIG. 5 shows the initial circuiting state of the current transmitted in the converter when the major switch Qa is turned-on, the boosting switch is turned-off and the full-bridge assembly switch Q41 to Q44 are all turned-off according to the present invention.

First, FIG. 5 shows the initial circuiting state of the current transmitted in the converter, wherein the major switch Qa is turned-on, the boosting switch is turned-off and the full-bridge assembly switch Q41 to Q44 are all turned off according to the present invention. If the voltage in phase-A is positive and the other voltages in phase-B and phase-C are negative, three-phases of input voltage passed through the three-phases inductors will be shortened. Then, the current in the major switch Qa will be linearly increased and no current passed through the other branches.

Figure 6:
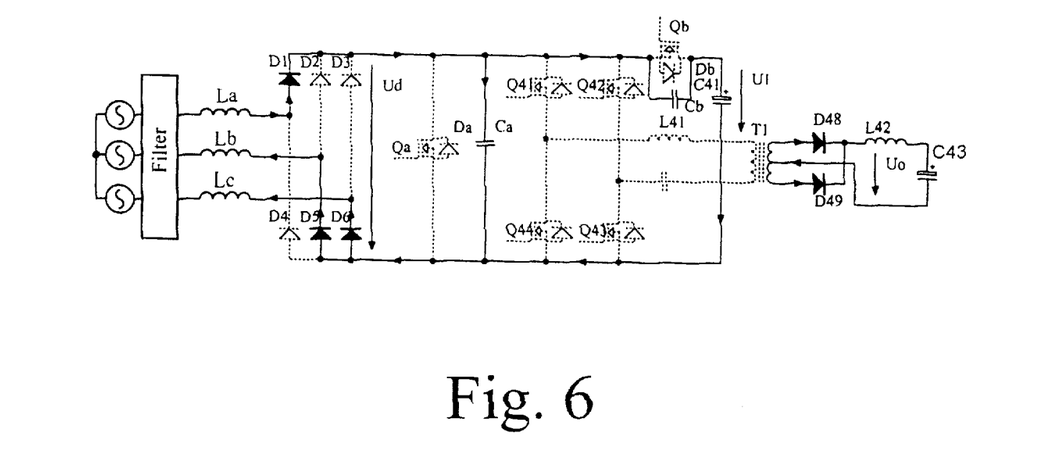
FIG. 6 shows the circuiting state of the current transmitted in the converter when the major switch Qa is turned-off, the boosting switch is turned-off and the full-bridge assembly switch Q41 to Q44 are all turned-off.

FIG. 6 shows the circuiting state of the current transmitted in the converter, wherein the major switch Qa is turned-off, the boosting switch Qb is turned-off and the full-bridge assembly switch Q41 to Q44 are all turned-off. In FIG. 6, the capacitor Ca connected in parallel with the Qa will be charged and slowly increased when the voltage Ud of the major switch Qa is applied by the three-phases voltage. If the capacitor Ca of the major switch is large enough or an additional capacitor is applied, the overlapping portions of the voltage and the current in the major switch Qa will be small enough to operate at zero-voltage in the major switch Qa.

Figure 7:
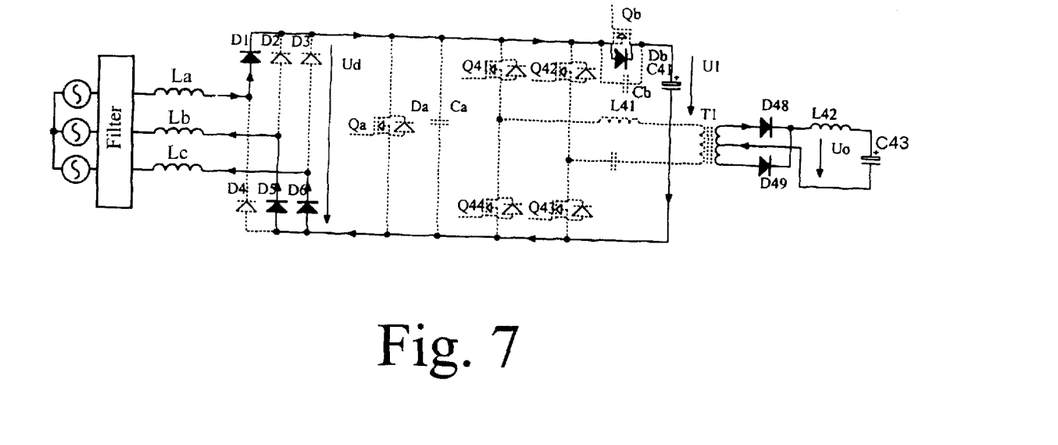
FIG. 7 shows the circuiting state of the current transmitted in the converter followed by FIG. 6 according to the present invention.

FIG. 7 shows the circuiting state of the current transmitted in the converter followed by FIG. 6 according to the present invention. When the voltage in the major switch is increased close to the output voltage of the mother direct current, the diode Db reversely connected in parallel with the boosting switch Qb will be turned on naturally, then the boosting switch Qb will be also turned on in sequence. In other word, the boosting switch Qb is conducted at zero-voltage as described in FIG. 6.

After the boosting switch Qb is turned on, whether the boosting switch Qb is turned on by itself or by the diode Db reversely connected in parallel with the boosting switch Qb, the full-bridge assembly switch will start to work as is shown in FIG. 7.

In the present invention, an inductor L41 connected in series with the transformer T1 is added to the converter. When the switch Q41 and Q43 are turned on and the transformer T1 is shortened, the current increasing rate of the switches Q41 and Q43 will be too high. If the inductor L41 is not inputted into the circuit, the high current increasing rate will cause a huge switches consuming rates by the largely overlapping portions of the voltage and the current in the switches Q41 and Q43. As a result, it is necessary to introduce the inductor L41 to limit the high current increasing rate. Because the reasons described above, the inductor L41 is so-called a limited inductor to reduce the large overlapping portions of the voltage and the current when the switches Q41 and Q43 are turned on. On the other word, the switches Q41 and Q43 can also be operated at zero-current.

When the switches Q41 and Q43 are turned on, the full-bridge switch assembly Q41 to Q44 can start to transmit the electrical energy toward the primary section of the transformer T1. The electrical energy stored in the PFC inductor can be directly delivered to the primary section of the transformer T1 during the transmitting period. If the electrical energy stored in the PFC inductor is not enough to be transmitted, the electrical power will be provided by the electrical energy stored in the mother direct current filtering capacitor C41. As the reasons described above, the converter is also called a guasi-unipole AC/DC converter.

Figure 8:
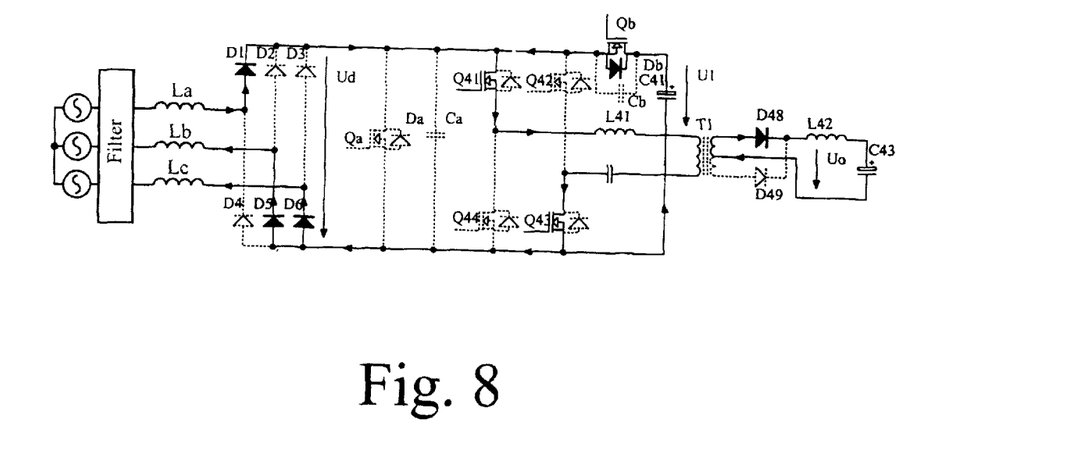
FIG. 8 shows the circuiting state of the current transmitted in the converter followed by FIG. 7 according to the present invention.

Then, the switch Qb is turned off, the switches Q41 and Q43 remain in turn-on state and the switches Qa, Q42 and Q44 keep in off state. FIG. 8 shows the circuiting state of the current transmitted in the converter followed by FIG. 7 according to the present invention. When the boosting switch Qb is turned off, the voltage in the switch Qb is slowly increased because the capacitor Cb of the switch Qb and the additional capacitor C41 in the Db are working. Thus, the boosting switch Qb is also turned off at zero-voltage.

Figure 9:
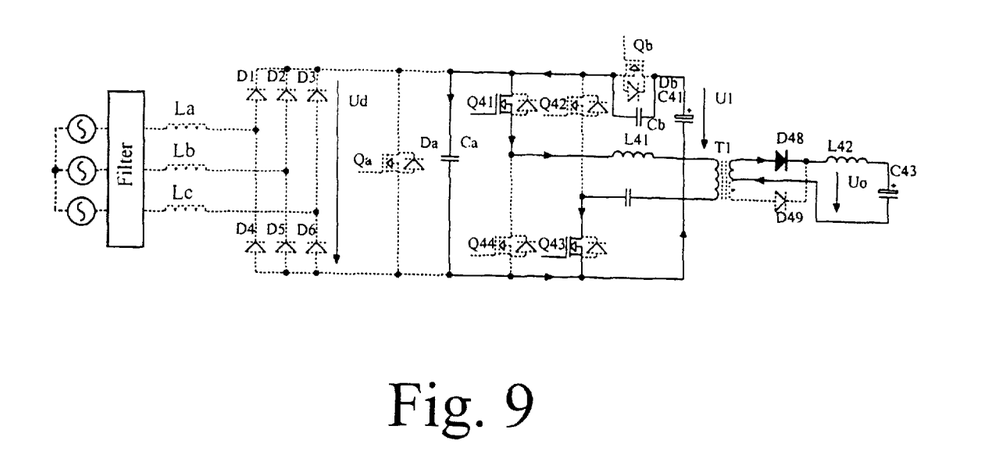
FIG. 9 shows the circuiting state of the current transmitted in the converter followed by FIG. 8 according to the present invention.
Figure 10:
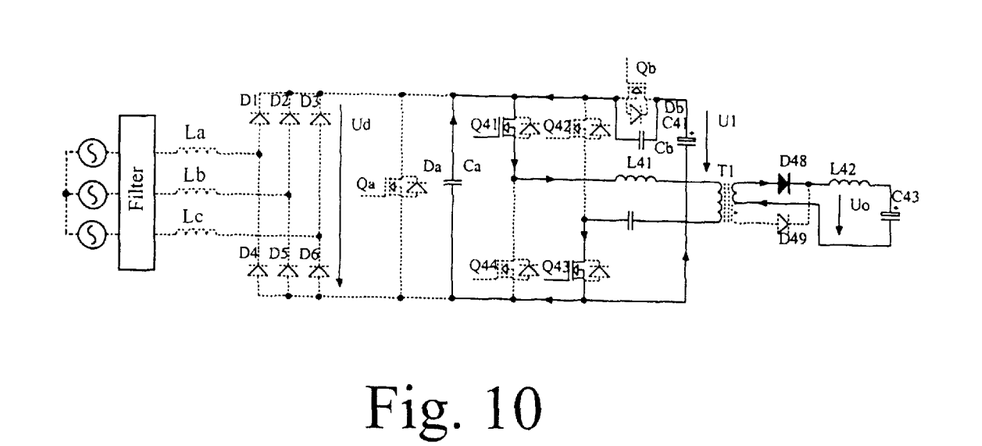
FIG. 10 shows the circuiting state of the current transmitted in the converter followed by FIG. 9 according to the present invention.

FIG. 10 shows the circuiting state of the current transmitted in the converter followed by FIG. 9 according to the present invention. After the boosting switch Qb is turned off, the output electrical energy can only be provided by the capacitor Ca of the major switch Qa or an additional assistant capacitor. Meanwhile, the voltage in the major switch Qa will be linearly reduced to zero owing to the operation of a loaded current. If the major switch Qa is turned on after the voltage is reduced to zero, the major switch Qa will be turned on at zero-voltage. In the stage, the switches Qb, Q42 and Q44 all keep in an off state, and switches Q41 and Q43 keep in an on state.

Figure 11:
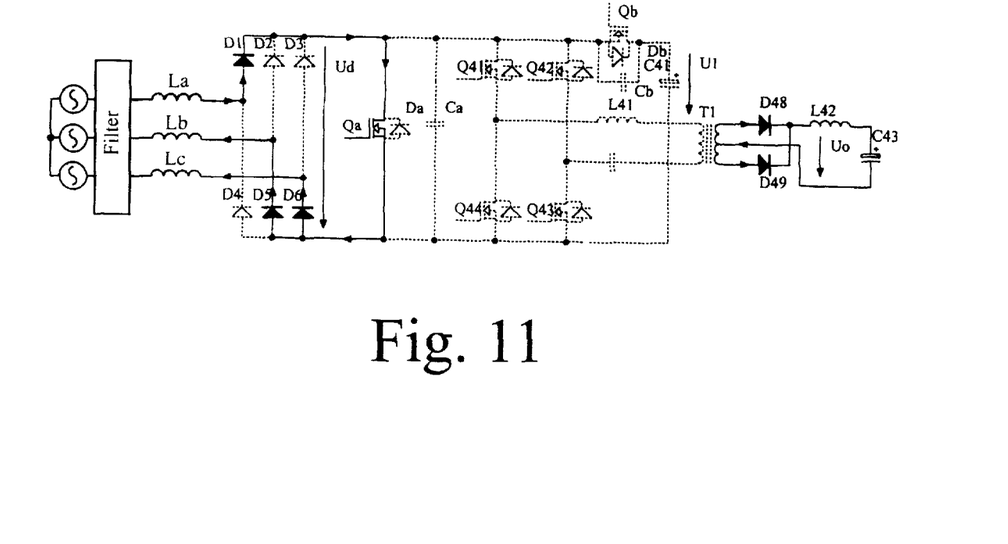
FIG. 11 shows the circuiting state of the current transmitted in the converter followed by FIG. 10 according to the present invention.

FIG. 11 shows the circuiting state of the current transmitted in the converter followed by FIG. 10 according to the present invention. The switches Q41 and Q43 of the full-bridge switches assembly will be turned off after the major switch Qa is turned on. Because the major switch Qa keeps turning on, the voltage of the major switch Qa will be remained at zero. In this situation, the voltages of two switches Q41 and Q43 will be remained at zero all the time so as to operate two switches Q41 and Q43 at zero-voltage.

Then, the major switch Qa keeps conducting and the current in the major switch Qa will be linearly increased, as can be seen in FIG. 5.

The inductive current as the above described is reduced to zero and in an off state, but begin to increase again from zero at this stage. The increased inductive current will do a great help for the circuit structure in the present invention to reduce the input harmonic wave. Thereafter, the major switch Qa will be turn off at zero-voltage. The current transmitted process is the same as that of in FIG. 6.

The diode Db reversely connected in parallel with the boosting switch Qb will be turned on at zero-voltage again when the voltage of the major switch Qa is closely increased to a direct-current mother voltage. Then, the switches Q42 and Q44 of the full-bridge switching assembly will be turned on at zero-voltage and the working principle of turning on the switches Q42 and Q44 is the same as that of turning on situation in switches Q41 and Q43. Subsequently, the boosting switch Qb will be turned off at zero-voltage when the capacitor Cb and the additional capacitor are applied. After the switch Qb is turned off, the voltage of the major switch Qa will be reduced by influencing of the turned-on switches Q42 and Q44, and the major switch Qa will be turned-on again at zero-voltage. Moreover, the switches Q42 and Q44 will be turned off at zero-voltage when the major switch Qa is turned on.

In addition to the capacitor Ca of the major switch Qa and capacitor Cb of the boosing switch Qb, an additional capacitor respectively coupled in parallel with the major switch Qa and the boosting switch Qb can be applied to the converter to replace the switches Qa and Qb. The replaced capacitors can be a constant capacitor or a value-changeable capacitor such as an adjustable capacitor and a switchable capacitor. From the above analysis and described, the switches in the present invention can be worked in a soft-switching state so as to be operated in a higher converting efficiency.

However, the input current has a large pulsating wave because the input current is in a discontinued situation. For making sure that the voltage Ud of the mother direct circuit and the output voltage can be regulated at the same time, the duty ratio of the output voltage would be reduced to be very small; therefore, the circuit cannot be used at its highest efficiency. In order to overcome the problem as described above, a further combined circuit according to the preferred embodiment of the present invention for reducing the large pulsating wave of the input current and increasing the duty ratio of the output voltage is also provided.

Figure 12:
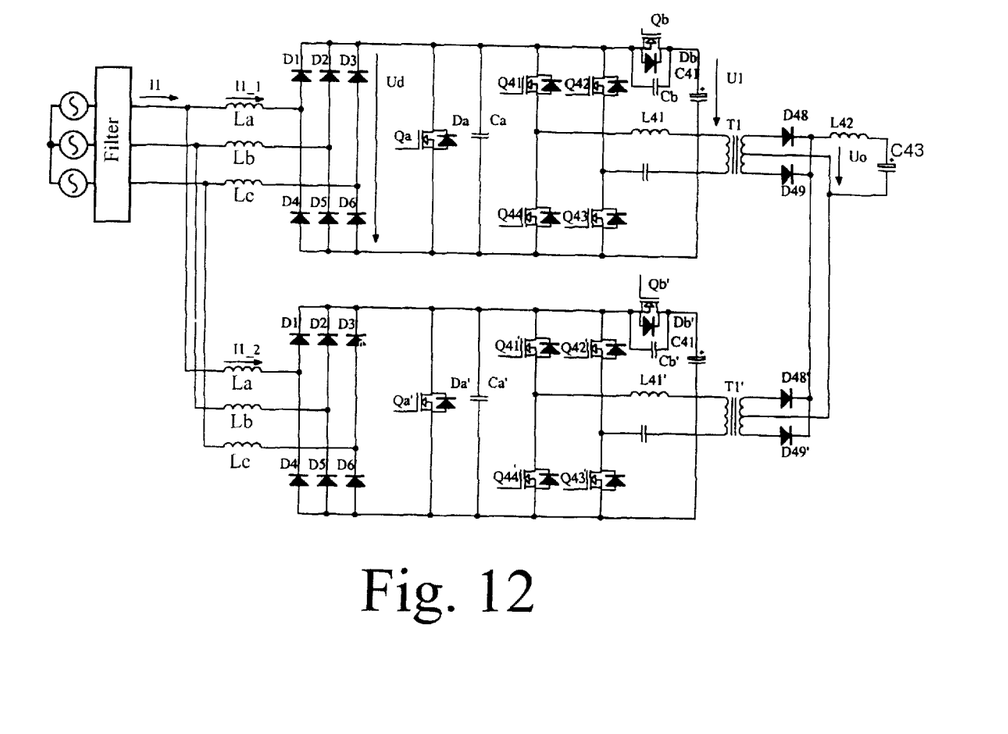
FIG. 12 shows a combined circuit is connected in parallel with two guasi-unipole-PFC AC/DC converters for converting an electrical power at an interleaving working state according to the preferred embodiment of the present invention.
Figure 13:
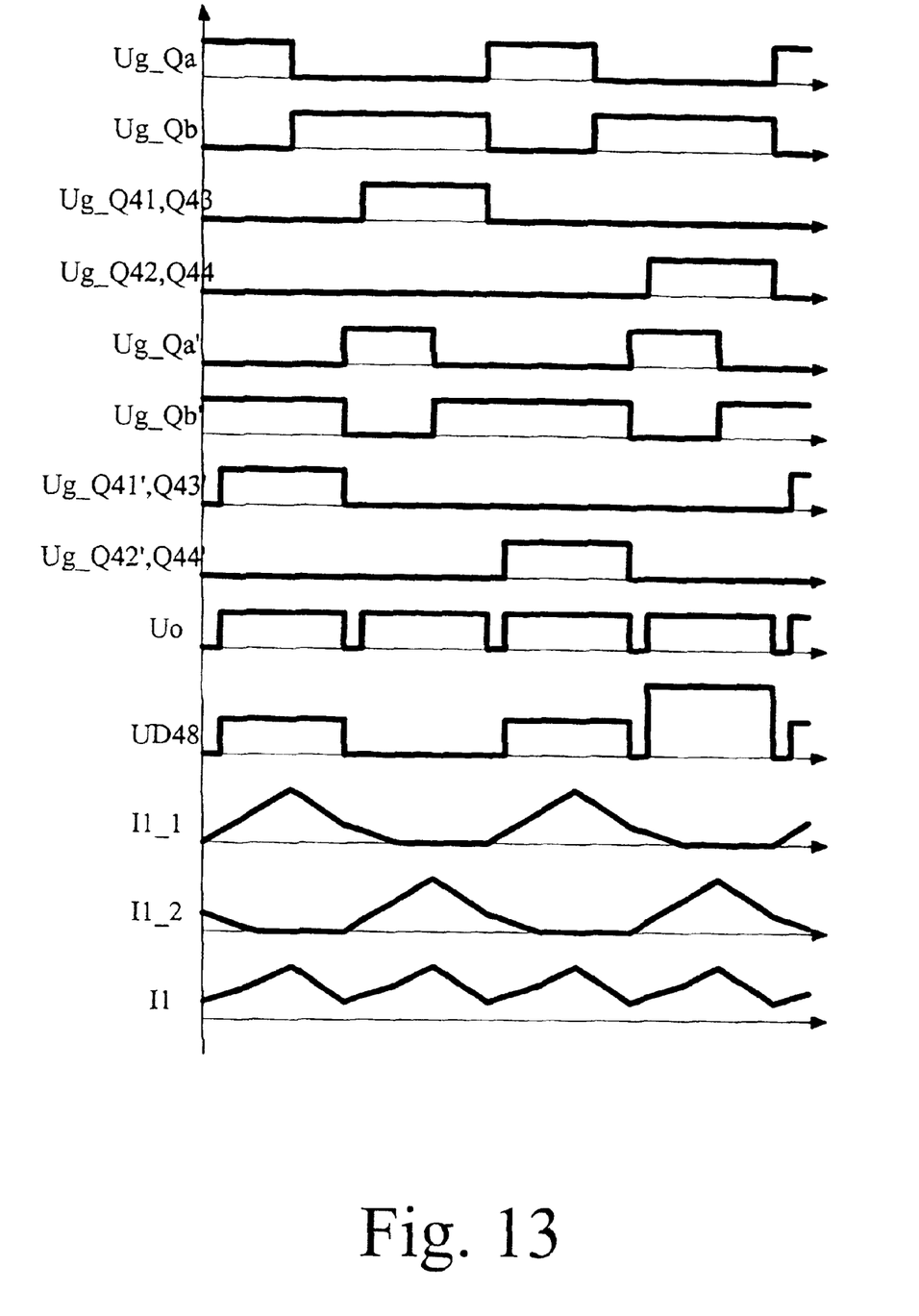
FIG. 13 shows the pulsating waves of the voltages in the two guasi-unipole-PFC AC/DC converters are working at an interleaving working state shown in FIG. 12.

FIG. 12 shows the combined circuit is connected in parallel by two guasi-unipole-PFC AC/DC converters for converting an electrical power at an interleaving working state according to the preferred embodiment of the present invention. FIG. 13 shows the pulsating waves of the voltages in the two guasi-unipole-PFC AC/DC converters working at an interleaving working state shown in FIG. 12.

As can be seen from FIG. 13, the value of the total input current of the combined circuit used for reducing the large pulsate in the input current is summed by the two currents in the two circuits because the two circuits of two guasi-unipole-PFC AC/DC converters is worked at an interleaving working state. Similarly, the value of the output voltage of the combined circuit for increasing a duty ratio closed to 100% and highly increasing the converting efficiency is also implemented by summing the two voltages in the two circuits in the present invention. In FIG. 13, the pulsating wave Ug_Qa is the driving voltage wave of the major switch Qa, the pulsating wave Ug_Qb is the driving voltage wave of the boosting switch Qb, the pulsating waves Ug_Q41 and Ug_Q43 are the driving voltage waves of the switches Q41 and Q43, the pulsating waves Ug_Q42 and Ug_Q44 are the driving voltage waves of the switches Q42 and Q44, the pulsating wave Ug_Qa' is the driving voltage wave of the major switch Qa', the pulsating wave Ug_Qb' is the driving voltage wave of the switche Qb', the pulsating waves Ug_Q41' and Ug_Q43' are the driving voltage wave of the switches Q41' and Q43', the pulsating waves Ug_Q42' and Ug_Q44' are the driving voltage wave of the switches Q42' and Q44', the pulsating waves Uo is the driving voltage wave of Uo shown in FIG. 12, and the pulsating waves i1 is a phase-A current not yet filtered by the EMI filter and is also summation of the two phase-A interleaving currents I 1_1 and I1_2 of the two circuits.

The working pulsating waves of the two major switches Qa and Qa' have a pulse delay by 180°; thus, the voltage of the major switch Qa' will be presented when the voltage of the major switch Qa is zero, on the other hand, the voltage of the major switch Qa can also be presented when the voltage of the major switch Qa' is zero. As a result, the duty ratio of the output voltage in the combined circuit will reach 100%, but the duty ratio of the respective circuit is just 50%. Moreover, if the input current in the major switch Qa is little and the other input current in the major switch Qa' is large, the pulsating wave of the summated input current in the combined circuit can be reduced. Thus, the filter for filtering the input current according to the present invention can be smaller than usual. Furthermore, the combined circuit in the present invention brings an advanced advantage of reducing the voltage stress of the output diode. The working principle of the switching diodes shown in FIG. 12 in the present invention is described as the following descriptions.

If the combined circuit shown in FIG. 12 is initiated conducted by switches Q41 and Q43 in one sub-circuit, i.e. the lower one of the combined circuit shown in FIG. 12, the diode Q48' would be conducted at first so as to transmit electrical power to the negative carrying end, the diode Q49' at the same sub-circuit is conducted and the diodes D48 and D49 disposed on the other sub-circuit, i.e. the upper one of the combined circuit, are turned-off. As a result, the output voltage of the transformer T1 is zero and the added reverse bias voltage in the diodes D48 and D49 are Uo. At the same time, another reverse bias voltage 2Uo will be produced in the diode D49' owing to the output voltage of the transformer T1'. Then, the switch Qa' is conducted, the switches Q41' and Q43' are turned-off and the output voltage of the transformer T1' is zero. Next, the switches Q41 and Q43 disposed on the other sub-circuit are conducted initially and the diode D48 is conducted at this moment. The reverse bias voltage added to the diode D49 is 2Uo, and the reverse bias voltage added to the diode D48' and D49' is Uo. Because, the diode D48' is the only diode conducted at beginning, thus the diode D48' will have an overloaded voltage produced due to reversely recovering effect. The actual voltage is less than 2Uo when the reverse bias voltage of the diode D48' Uo is added to the overloaded voltage. As can be known, the diode D49' needs no reverse bias voltage for reversely recovering effect, thus the voltage of the diode D49' is 2Uo. As a result, the output voltage of any diode in the present invention will be less than 2Uo and the high voltage stress will not be yielded when the diode is in reverserly recovering state.

Accordingly, the converter of the present invention achieves the following advantages:

(1) the consuming rate of the switches is reduced;
(2) the output voltage stress of the diode in the present invention is little, the large duty ratio lost problem is overcome;
(3) only a small EMI filter and a small input current filter are required;
(4) the major circuit and the circuit to be used for the power converter to control are simple;
(5) the harmonic wave inputted in the converter can meet the requirement of the IEC61000-3-2 safety standard; and
(6) a high converting efficiency is operated by the power converter.

The above descriptions for illustrating the working principle and the converter structure of the present invention are based on an AC/DC converter. It goes without saying that the converter in the present invention can be further applied in an AC/AC converter, a DC/DC converter and a DC/AC converter. Furthermore, the combined circuit shown in FIG. 12 can also be connected with the various converters described above to convert the electrical power as the users wishes.

Figure 14:
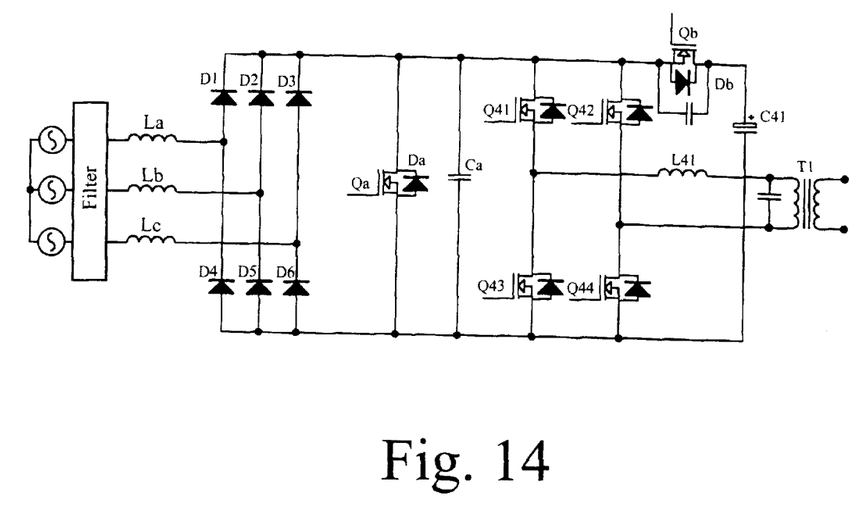
FIG. 14 shows a circuit structure of an AC/AC converter according to the preferred embodiment of the present invention.
Figure 15:
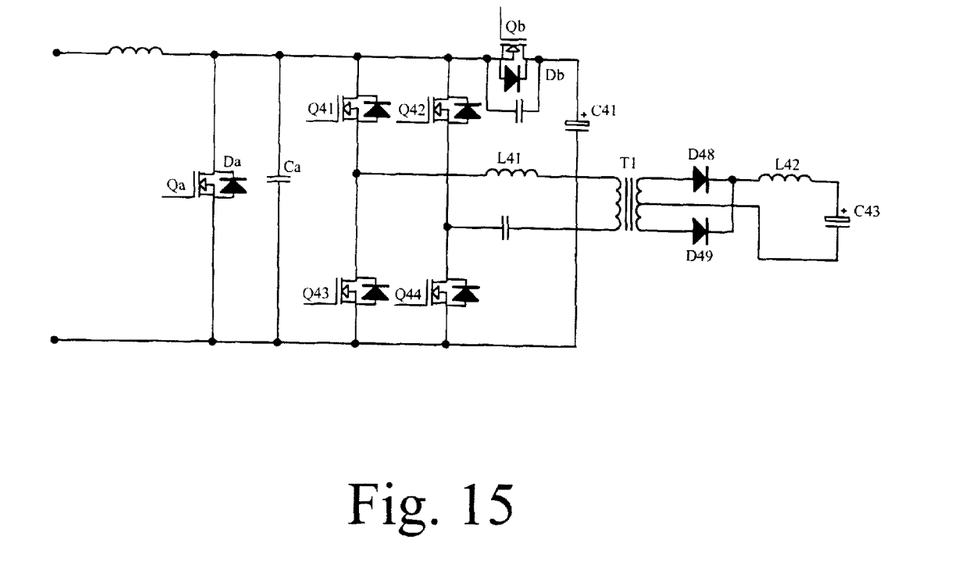
FIG. 15 shows a circuit structure of a DC/DC converter according to the present invention by deleting the first rectifying circuit shown in FIG. 4.
Figure 16:
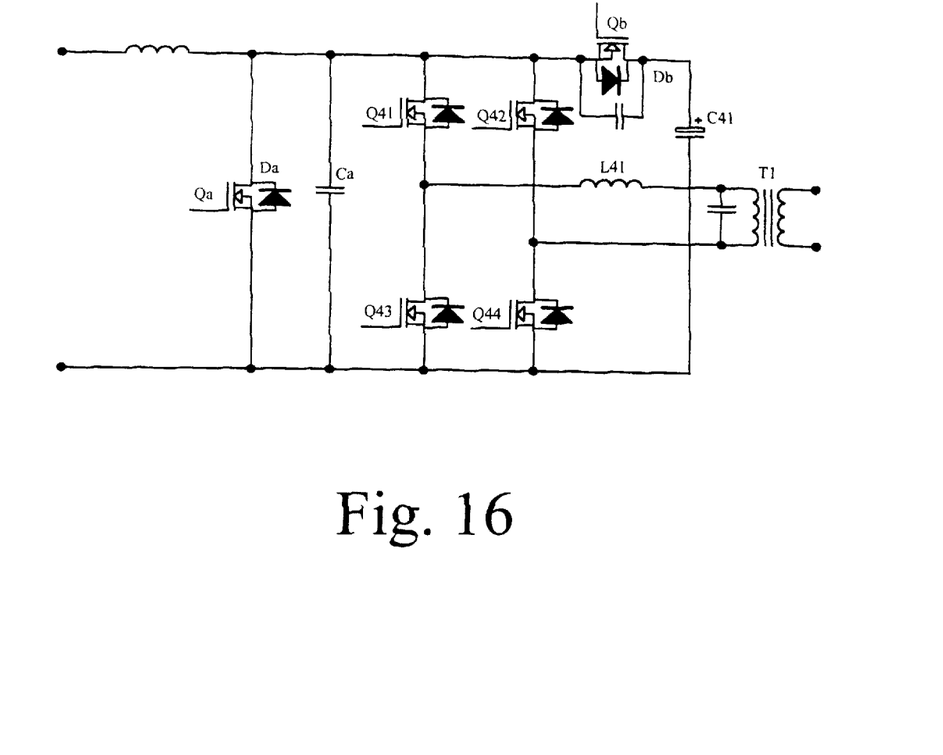
FIG. 16 shows a circuit structure of a DC/AC converter according to the present invention by further deleting the second rectifying circuit and the LC filtering circuit after FIG. 15.

FIG. 14 shows a circuit structure of an AC/AC converter according to the present invention. The circuit shown in FIG. 14 is formed on basis of the circuit shown FIG. 4, but lack of the transformer T1, the second rectifying circuit and the LC filtering circuit are omitted. FIG. 15 shows a circuit structure of a DC/DC converter according to the present invention by deleting the first rectifying circuit shown in FIG. 4. FIG. 16 shows a circuit structure of a C/DAC converter according to the present invention by further deleting the second rectifying circuit and the LC filtering circuit after FIG. 15.

Figure 17:
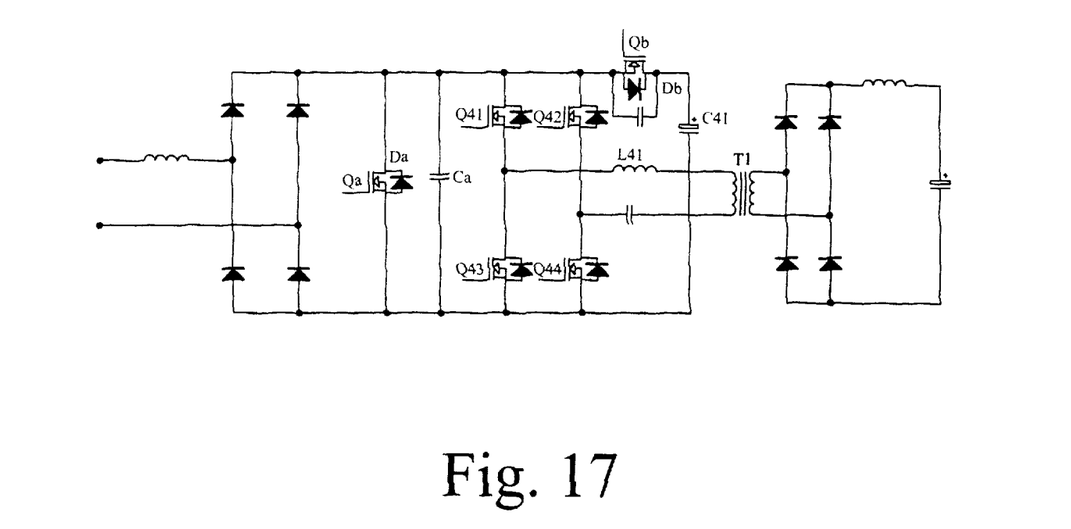
FIG. 17 shows an AC/AC converter is used for converting an input single-phase alternating current according to the preferred embodiment of the present invention.
Figure 18:
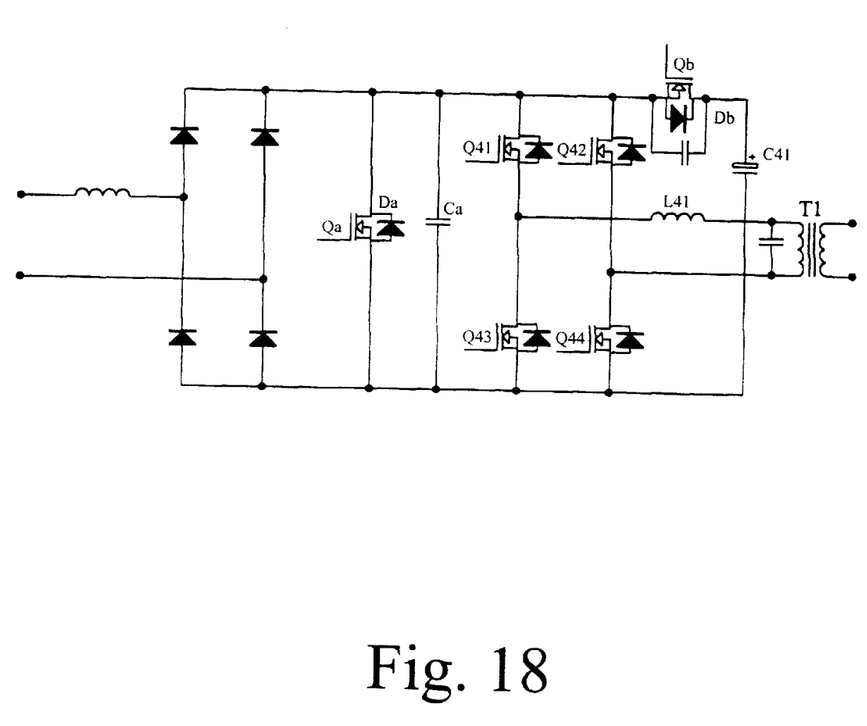
FIG. 18 shows an AC/DC converter is used for converting the single-phase alternating current according to the preferred embodiment of the present invention.

The three-phases current is to be respectively inputted into the AC/DC converter and the AC/AC converter. Alternatively, a single-phase current, i.e. a bridge-type rectifying circuit, a full-wave rectifying circuit and a single-wave rectifying circuit can be used for replacing of the three-phases current in the front of the first rectifying circuit. FIG. 17 shows the AC/AC converter which is used for converting the input single-phase alternating current. FIG. 18 also shows the AC/DC converter is used for converting the single-phase alternating current.

The switching devices in the present invention are full-bridge switching devices. As all known, the full-bridge switching devices can also be replaced by a half-bridge switching device, a forward switching device and a backward switching device.

While the invention has been described in terms of what are presently considered to be the most practical and preferred embodiments, it is to be understood that the invention needs not be limited to the disclose embodiments. On the contrary, it is tented to cover various modification and similar arrangements included within the spirit and scope of the appended claims which are be accorded with the broadest interpretation so as to encompass all such modifications and similar structure.

What we claim is:

1. A power converter, comprising:
   a first converting circuit, said first converting circuit having
   switch assembly alternatively turning on and off for converting a direct current (DC) to a first alternating current (AC);
   a transformer coupled to said switch assembly for transforming said first alternating current to a second alternating current;
   a major switch coupled in parallel with said switch assembly, and a first switch device couple in parallel with said major switch; and
   a series-couple boosting switch and a first capacitor coupled in parallel with said switch assembly, said boosting switch coupled in parallel with a second switch device.

2. The power converter according to claim 1, wherein said first converting circuit further comprising a current-limiting inductor coupled in series between said transformer and said switch assembly.

3. The power converter according to claim 1, wherein said first capacitor is a wave-filtering capacitor.

4. The power converter according to claim 1, wherein said major switch is further coupled in parallel with a second capacitor and said boosting switch is further coupled in parallel with a third capacitor.

5. The power converter according to claim 4, wherein said second capacitor and said third capacitor are respectively the internal capacitors of said major switch and said boosting switch.

6. The power converter according to claim 4, wherein each of said second capacitor and said third capacitor is one of adjustable capacitor and constant capacitor.

7. The power converter according to claim 1, further comprising a second converting circuit having a structure the same as that of said first converting circuit and coupled in parallel with said first converting circuit.

8. The power converter according to claim 1, wherein said first converting circuit further comprises a first rectifying circuit coupled in parallel with said switch assembly and said major switch.

9. The power converter according to claim 8, wherein said first rectifying circuit is one of a single-phase rectifying circuit and three-phase rectifying circuit.

10. The power converter according to claim 8, further comprising a third converting circuit having a structure the same as that of said first converting circuit and coupled in parallel with said first converting circuit.

11. The power converter according to claim 1, wherein said first converting circuit further comprises a second rectifying circuit coupled to said transformer and a LC wave-filter coupled to said second rectifying circuit.

12. The power converter according to claim 11, wherein said second rectifying circuit is one of a single-phase rectifying circuit and three-phase rectifying circuit.

13. The power converter according to claim 11, further comprising a fourth converting circuit having a structure the same as that of said first converting circuit and coupled in parallel with said first converting circuit.

14. The power converter according to claim 1, wherein said switch assembly is one of a full-bridge switch assembly and half-bridge switch assembly.

15. The power converter according to claim 1, wherein said switch assembly is one of uni-polar and bipolar transistors.

16. The power converter according to claim 1, wherein said first alternative current is a high frequency alternative current.

17. The power converter according to claim 1, wherein said first switch device is a first diode reversely coupled in parallel with said major switch.

18. The power converter according to claim 17, wherein said second switch device is a second diode reversely coupled in parallel with said boosting switch.

19. The power converter according to claim 18, wherein said first diode and said second diode are respectively the internal diodes of said major switch and said booting switch.

20. A power converter, comprising:
   a first converting circuit, said first converting circuit having
      a switch assembly alternatively turning on and off for converting a direct current (DC) to a first alternating current (AC);
      a transformer coupled to said switch assembly for transforming said first alternating current to a second alternating current;
      a major switch coupled in parallel with said switch assembly and a first switch device; and
      a series-couple boosting switch and a first capacitor coupled in parallel with said switch assembly and said boosting switch couple in parallel with a second switch device;
   a current-limiting inductor coupled in series between said transformer and said switch assembly.

21. The power converter according to claim 20, wherein said major switch is further coupled in parallel with a second capacitor and said boosting switch is further coupled in parallel with a third capacitor.

22. The power converter according to claim 20, further comprising a second converting circuit having a structure the same as that of said first converting circuit and coupled in parallel with said first converting circuit.

23. The power converter according to claim 20, wherein said first converting circuit further comprises a first rectifying circuit coupled in parallel with said switch assembly and said major switch.

24. The power converter according to claim 23, further comprising a third converting circuit having a structure the same as that of said first converting circuit and coupled in parallel with said first converting circuit.

25. The power converter according to claim 20, wherein said first converting circuit further comprises a second rectifying circuit coupled to said transformer and a LC wave-filter coupled to said second rectifying circuit.

26. The power converter according to claim 25, further comprising a fourth converting circuit having a structure the same as that of said first converting circuit and coupled in parallel with said first converting circuit.

27. The power converter according to claim 20, wherein said switch assembly is one of a full-bridge switch assembly and half-bridge switch assembly.

28. The power converter according to claim 20, wherein said first switch device is a first diode reversely coupled in parallel with said major switch.

29. The power converter according to claim 28, wherein said second switch device is a second diode reversely coupled in parallel with said boosting switch.

30. A power converter, comprising:
   a first converting circuit, said first converting circuit having
      a switch assembly alternatively turning on and off for converting a direct current (DC) to a first alternating current (AC);
      a transformer coupled to said switch assembly for transforming said first alternating current to a second alternating current;
      a major switch coupled in parallel with said switch assembly, and a first switch device couple in parallel with said major switch;
      a series-couple boosting switch and a first capacitor coupled in parallel with said switch assembly, said boosting switch couple in parallel with a second switch device;
      a first rectifying circuit coupled in parallel with said switch assembly and said major switch;
      a second rectifying circuit coupled to said transformer; and
      a LC wave-filter coupled to said second rectifying circuit.

31. The power converter according to claim 30, further comprising a second converting circuit having a structure the same as that of said first converting circuit and coupled in parallel with said first converting circuit.

32. The power converter according to claim 30, wherein said first converting circuit further comprises a current-limiting inductor coupled in series between said transformer and said switch assembly.

33. The power converter according to claim 32, further comprising a third converting circuit having a structure the same as that of said first converting circuit and coupled in parallel with said first converting circuit.

* * * * *